United States Patent [19]
Bardocz

[11] 3,892,475
[45] July 1, 1975

[54] LASER BEAM ADJUSTMENT APPARATUS
[75] Inventor: Arpad Bardocz, Munich, Germany
[73] Assignee: Physik Instrumente (PI) GmbH, Munich, Germany
[22] Filed: Sept. 5, 1973
[21] Appl. No.: 394,549

[30] Foreign Application Priority Data
Sept. 12, 1972 Germany............................ 2244578

[52] U.S. Cl................................. 350/285; 356/138
[51] Int. Cl................................................ G01c 3/00
[58] Field of Search ...... 331/94.5, DIG. 1; 350/301, 350/285; 356/3, 138

[56] References Cited
UNITED STATES PATENTS
3,471,234  10/1969  Studebaker...................... 331/94.5

*Primary Examiner*—William L. Sikes
*Attorney, Agent, or Firm*—Edwin E. Greigg

[57] ABSTRACT

A conventional laser is mounted vertically within a tubular housing having a circular cross section. The bottom of the tubular housing rests on a pivot bearing. The laser beam issues from the top of the housing through a suitable aperture. The laser beam emerging from the housing is directed by a system of mirrors, at least one of which is adjustable.

11 Claims, 4 Drawing Figures

3,892,475
SHEET 3
Fig. 3a
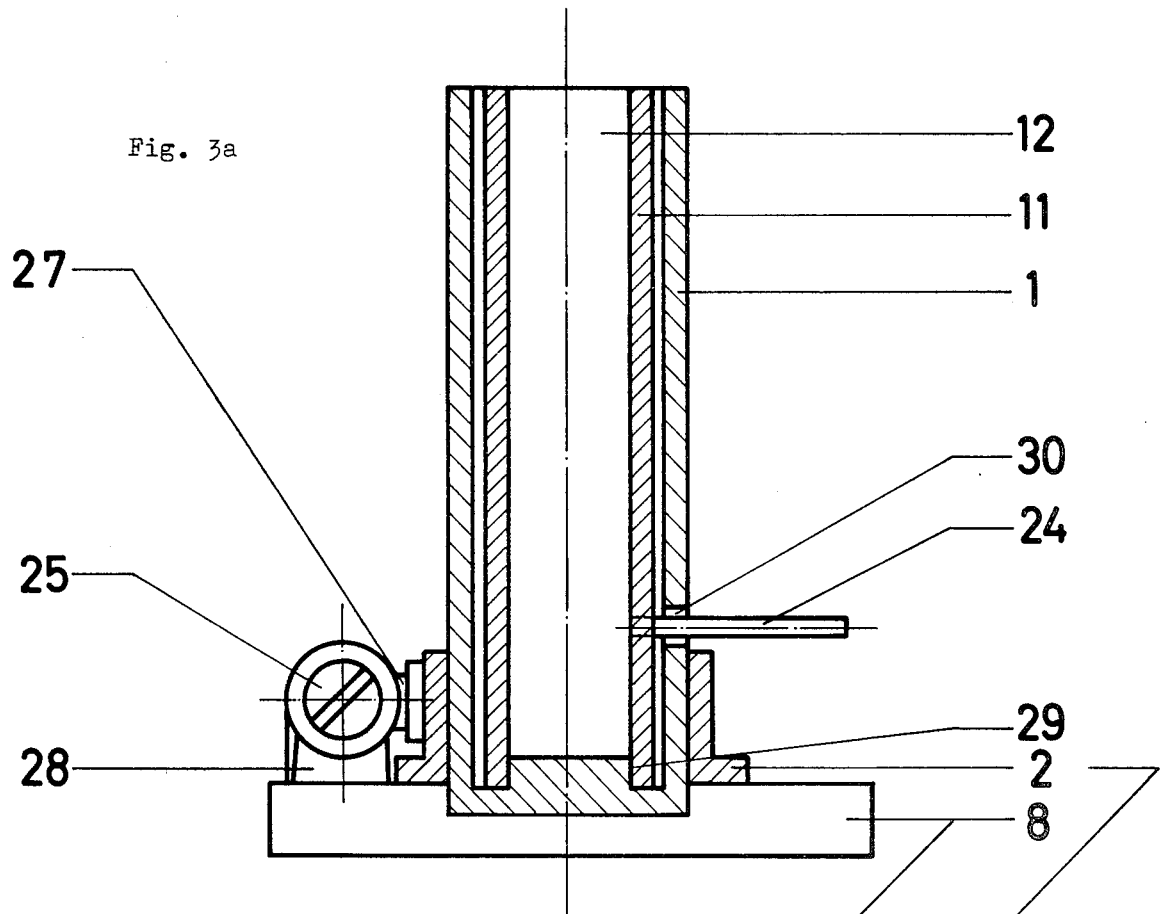
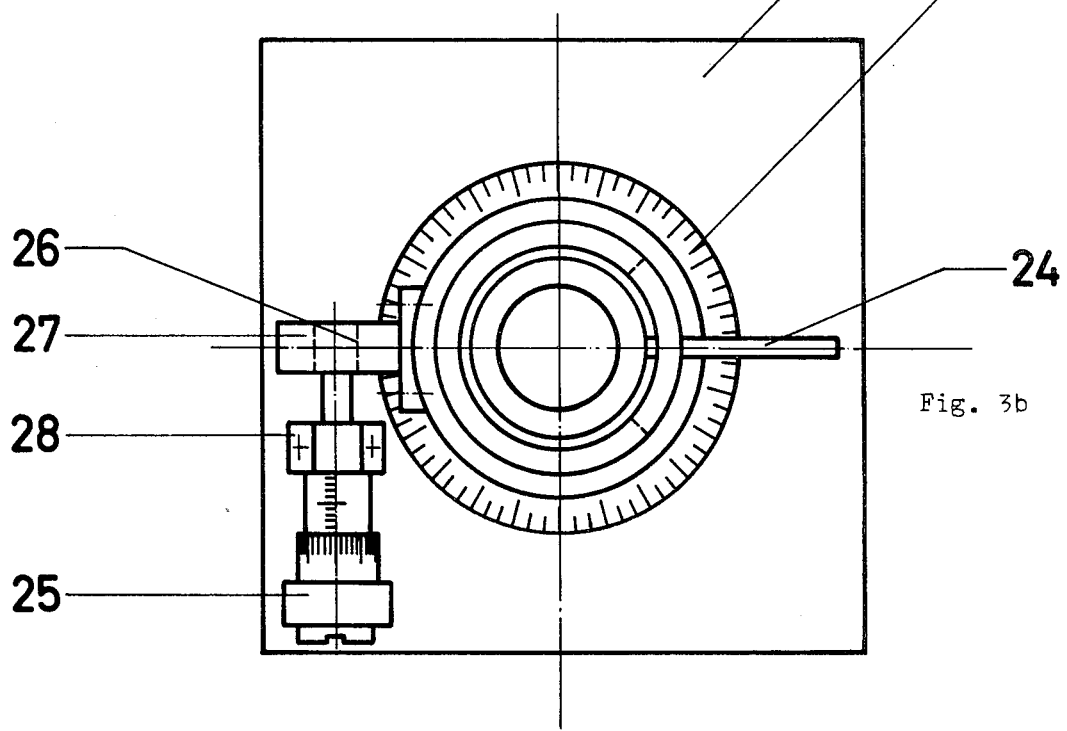
Fig. 3b

LASER BEAM ADJUSTMENT APPARATUS

BACKGROUND OF THE INVENTION

The invention relates to a laser beam adjustment apparatus which effects adjustment of the direction of the laser beam in vertical and horizontal planes. The invention relates, more particularly, to a laser with beam adjustment apparatus which allows linear adjustment of the laser beam in the vertical and horizontal planes and also the angular deflection of the beam in these two planes. The invention relates to a laser beam adjustment apparatus which, in a particularly preferred form, also allows setting of the plane of polarization of the laser beam.

A laser, especially a gas laser, is a relatively long device. The required length of a gas laser derives from the fact that a long column of gas is needed for exciting the laser beam. As it is known, the length of conventional lasers ranges from about 10 cm to about 1 meter.

In all its applications a laser beam has to be directed with the above-mentioned characteristics properly taken into account. Furthermore, adjustment of the direction of a laser beam has to be performed with great, sometimes extreme, precision. In optics, for example, when a laser is placed on an optical bench, so that the laser beam is parallel to the optical axis, the laser normally has to be supported at two points. Apart from the fact that the laser occupies, in the horizontal position, considerable space, adjustment is extremely difficult and can only be performed with a certain degree of approximation.

The difficulties involved in adjusting a laser are well known. These difficulties have given rise to various optical adjustment systems for directing the laser beam issuing from a rigidly set laser, these systems being independent of the laser itself. Such systems do not, however, reduce the amount of space needed and are limited in their application. They do not allow, for example, rotation of the plane of polarization.

SUMMARY OF THE INVENTION

It is an object of the present invention to provide a laser beam adjustment apparatus which reduces the amount of space needed, in the horizontal direction, while providing simultaneously the possibility of adjusting the direction of the laser beam.

It is another object of the present invention to provide a laser beam adjustment apparatus which allows the laser to be supported vertically while simultaneously allowing the possibility of adjusting the direction of the laser beam.

The foregoing objects, as well as others which are to become apparent from the following text, are accomplished in accordance with the present invention by providing a laser beam adjustment apparatus which includes a housing containing a laser. At least one mirror is directly attached to the housing for intercepting the laser beam and adjusting its direction.

In a preferred form, the housing which contains the laser includes an inner tubular member and an outer tubular member mounted coaxially with respect to one another, the laser being contained within the inner tubular member. The inner tubular member is surrounded by the outer tubular member and is independently rotatable.

The housing is preferably supported on a pivot bearing member for rotation.

In a preferred embodiment, the laser beam is directed by three mirrors, at least one of which is tiltable in at least one plane. More than one of three mirrors may be tiltable, if desired, for some applications.

It is a further feature of possible embodiments that the pivot bearing member is mounted on a carrier for movement in a first plane, this carrier being mounted on a cross carrier which is operatively arranged for movement along a track or the like on an optical bench.

The bench adjustment instrumentalities preferably include precision scales for accurately setting the laser beam direction.

The laser beam may be directed, with high precision, in various directions within three dimensions.

BRIEF DESCRIPTION OF THE DRAWINGS

FIG. 3a is a vertical section through the base region of the apparatus, showing the mechanism for rotational adjustment of the housing members; and FIG. 3b is a top view of the apparatus shown in FIG. 3a.

DESCRIPTION OF THE PREFERRED EMBODIMENTS

Figure 1:
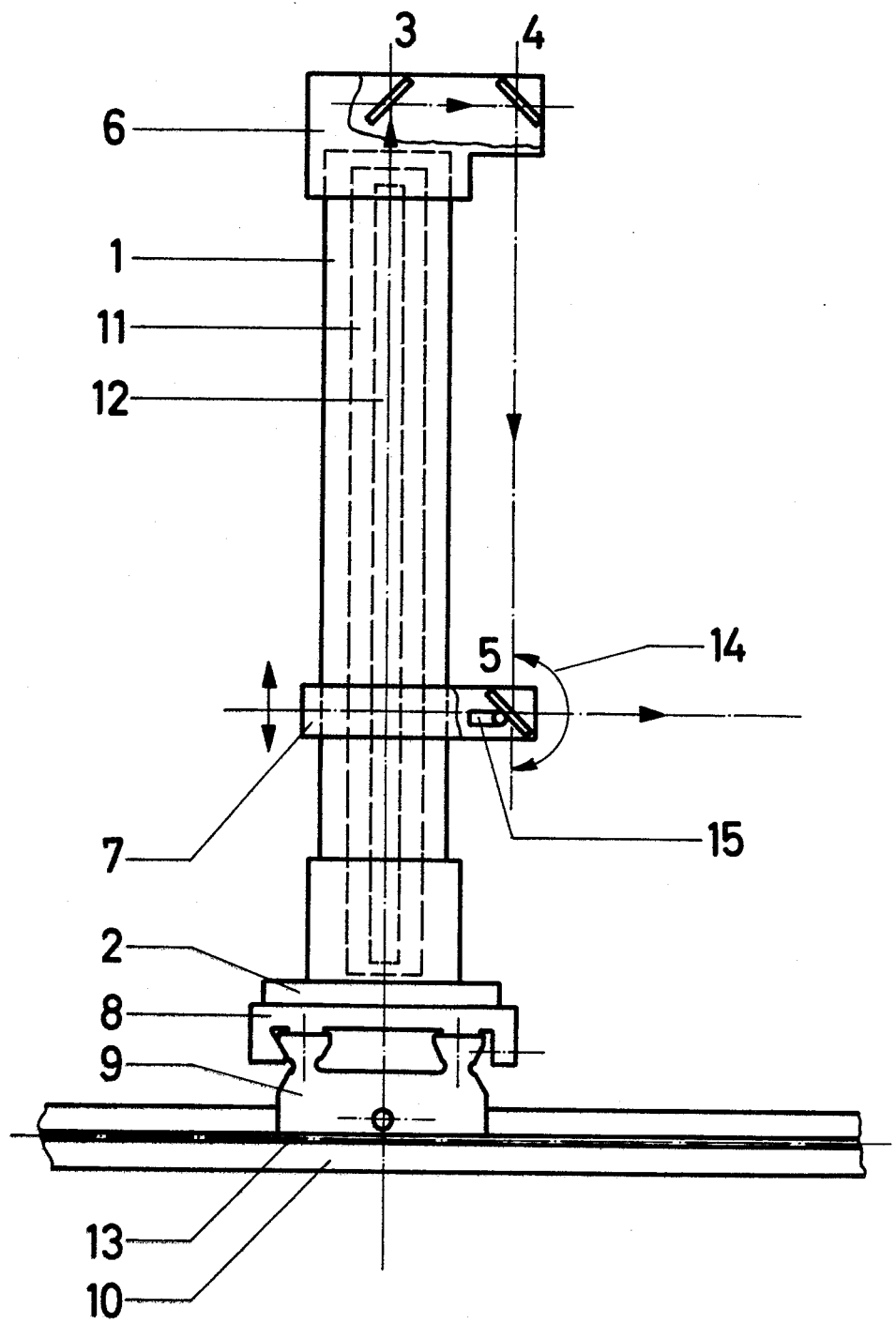
FIG. 1 is a schematic, elevational view, partially in section, of a laser beam adjustment apparatus according to the present invention.

As shown in FIG. 1, the laser beam adjustment apparatus according to the present invention has a first tubular member 1 of circular cross section. A second tubular member 11 is positioned within and coaxially with the first tubular member 1. The second tubular member 11 is independently rotatable about its longitudinal axis with respect to the outer tubular member 1. The rotation of the tubular member 11, with respect to the tubular member 1, is effected by conventional means. For example, the rotation of the tubular member 11 can be effected conventionally by a gearing system or the like, not visible in FIG. 1. It is to be appreciated that, for some applications, the tubular members 1 and 11 may be replaced by a single tubular member.

A conventional gas laser, illustrated diagramatically by the numeral 12, is fixedly positioned within the tubular member 11.

The tubular members 1 and 11 are carried on a supporting pivot bearing member 2 rotatable about an axis which is coaxial with the axes of rotation of the tubular members 1 and 11. Thus, the tubular members 1 and 11 can be jointly rotatable about their axes by simply rotating the pivot bearing member 2.

The pivot bearing member 2 is positioned on a carrier 8 having two downwardly extending portions which ride on and are supported by two tracks defined by upwardly extending portions of a cross carrier 9 which, in turn, is mounted on at least one track 13 or groove on an optical bench installation 10 or the like. Thus, the pivot bearing member 2 and the tubular members 1 and 11 can be conjointly moved in a first plane by moving the cross carrier 9 along the track 13 and in a second plane perpendicular to the first plane by moving the carrier 8 along the tracks of the cross carrier 9.

A first holder 6 is rotatably mounted, by conventional means, on the top of the tubular member 11 and can be independently rotated about the tubular member 11. A first mirror 3 and a second mirror 4 are mounted within the first holder 6 to reflect the laser beam produced by the laser 12, which beam reaches the first mirror 3 via coaxial apertures in the tubular members 1 and 11, the mirror 3 reflecting the laser beam toward the second mirror 4 which, in turn, reflects the laser beam toward a third mirror 5. The third mirror 5 is movably mounted on a second holder 7 positioned about the tubular member holder 7. The second holder 7 is mounted, by conventional means, for rotation about the tubular member 1 and can be shifted vertically along the tubular member 1.

The mirror 5 is mounted on the second holder 7 so that it may be tilted, as indicated by the arrow-headed line 14, in at least one plane, the mounting being illustrated generally by the numeral 15. Either one of the mirrors 3 and 4 or both of them may also be mounted, by conventional means, on the holder 6 for tilting in at least one plane similarly to the mirror 5, the mountings not being illustrated for the sake of clarity.

The pivot bearing member 2 is preferably provided on its visible surface with a circular scale and/or the adjustable mounting bearing of one or more of the mirrors 3, 4 and 5 is provided with a visible circular scale, allowing the laser beam adjustment apparatus of the present invention to be used for surveying work.

All of the motions described above are preferably performed using precision adjustment components set by means of micrometers. These allow fine and accurate adjustment of the laser beam adjustment apparatus according to preferred embodiments of the present invention.

The micrometer facilities can, and preferably are, provided with piezoelectric components, which allow extremely fine and highly accurate adjustment. The piezoelectric component, in each instance, is preferably placed between the micrometer spindle and the moving part of the adjustment system. Particularly suitable for the purpose are piezoelectric transducers which have a magnet at one end and a ferromagnetic plate at the other. If the moving part of the adjustment system, in any case, is fitted with a magnet, the piezoelectric component can be kept in place by magnetic forces.

In operation, the laser beam from the laser 12 can be vertically set by shifting the holder 7 together with the mirror 5. Adjustment in the horizontal plane, i.e. perpendicular to the optical axis, is performed by moving the carrier 8 mounted on the tracks of the cross carrier 9. Rotation of the laser beam in the horizontal plane is effected by jointly rotating the tubular member 1 and the tubular member 11 by moving the pivot bearing member 2. Angular adjustment in the vertical plane is achieved by tilting any one of the mirrors 3, 4 or 5 or more than one of them.

Figure 2:
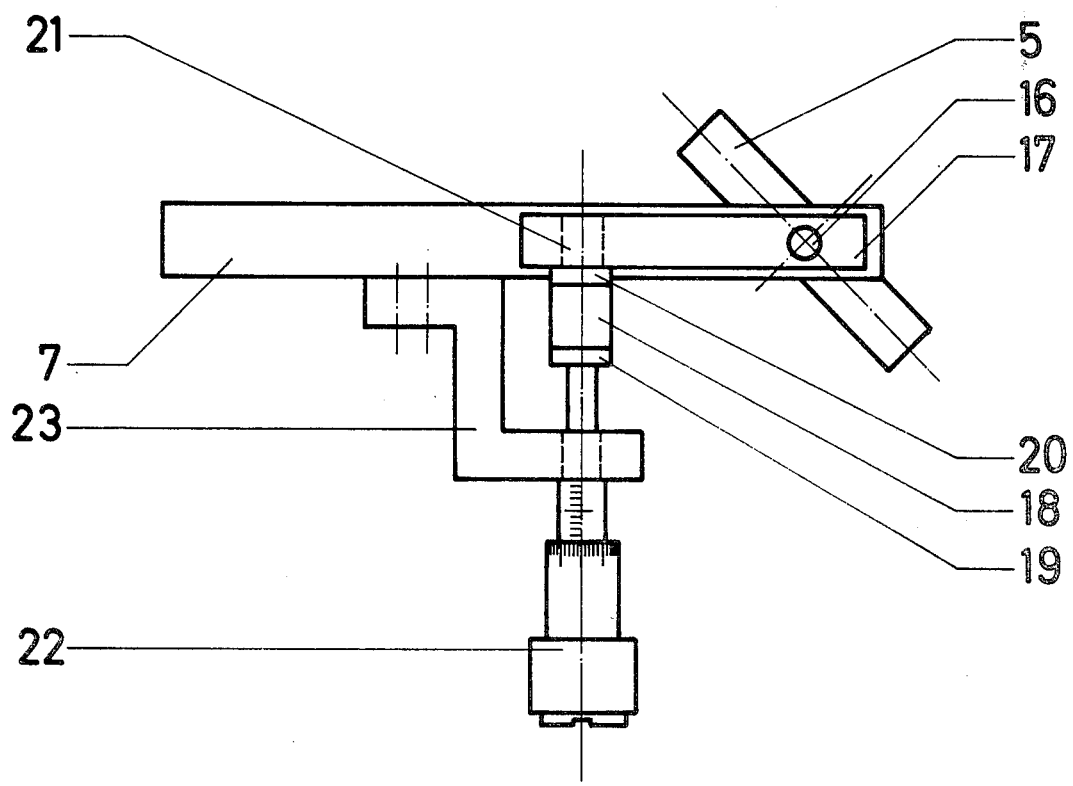
FIG. 2 is a detailed schematic representation of an adjustable mounting for the mirrors, including micrometric and piezoelectric elements.

If the laser beam emerging from the laser tube is polarized for any purpose, it is also necessary to perform rotation of the plane of polarization of the laser beam. This can be done according to the present invention in three ways. One way is to rotate the single tubular member, which may replace the tubular members 1 and 11, thus rotating the plane of polarization, the direction of the beam being maintained by turning the holders 6 and 7 back by the same angle. The second way is to lock the holders 6 and 7 in place and rotate the single tubular member. The third way is to use the two tubular members 1 and 11, one inside the other, instead of a single tubular member. The inner tubular member 11, which contains the laser, can be independently rotated and locked in any position. In this way the plane of polarization is rotated. The outer tubular member, which encloses the inner tubular member 11, in this instance supports the holders 6 and 7 and is used for adjusting the direction of the beam. FIG. 2 shows the details of a micrometer arrangement usable for tilting the mirror 5, including a piezoelectric transducer 18, associated magnet 19 and ferroelectric plate 20. The micrometer 22 actuating the mirror 5 is held by the arm 23, fixed to holder 7. Mirror 5 rotates about axis 16 on which the arm 17 is fixed. Arm 17 has a magnet insert 21 to couple arm 17 to the piezoelectric transducer.

FIGS. 3a and 3b show the rotating arrangement for rotating the inner tubular member 11 relative to the outer tubular member 1. Tube 11 containing the laser tube is pivoted at 29. Pin 24 is attached to tube 11. Tube 1 has an horizontal slot 30. By moving pin 24 in slot 30, tube 11 can be rotated. FIGS. 3a and 3b also contain the micrometer system for setting the pivot bearing member 2. Micrometer 25 is fixed to carrier 8 by holder 28. 27 is an arm fixed to pivot bearing 2 by the aid of which the movement of the micrometer is transmitted to pivot bearing 2.

That which is claimed is:

1. A laser beam adjustment apparatus, comprising:
   a. base means;
   b. a housing, mounted on said base means, substantially enclosing and holding a laser;
   c. a first holder, mounted on one end of said housing;
   d. first reflecting means, mounted on said first holder and pivotable around at least one axis of rotation, for intercepting the light beam emanating from said laser and for changing its direction of propogation;
   e. second reflecting means, mounted on said first holder and pivotable around at least one axis of rotation for intercepting the light beam reflected from said first reflecting means for changing its direction of propogation;
   f. a second holder, mounted on said housing;
   g. third reflecting means, mounted on said second holder and pivotable around at least one axis of rotation for intercepting the light beam reflected from said second reflecting means and for changing its direction of propogation.

2. A laser beam adjustment apparatus as defined in claim 1, wherein said second holder mounted on said housing is disposed to move substantially parallel thereto and wherein said third reflecting means are mounted on said second holder; whereby parallel movement of said second holder on said housing causes translational movement of the laser beam reflected by said third reflecting means.

3. A laser beam adjustment apparatus as defined in claim 1, wherein said base means includes:
   i. a pivot bearing member, fixedly attached to the other end of said housing; and
   ii. a carrier; whereby said pivot bearing member is adjacent to and is rotatable relative to said carrier.

4. A laser beam adjustment apparatus as defined in claim 3, wherein said base means further includes:
   iii. a cross-carrier and a track, capable of relative translational motion, said carrier resting on and capable of relative translational motion with respect to said cross-carrier; whereby said carrier, said cross-carrier and said track act in the manner of a universal cross-slide, permitting translation of said housing in a plane.

5. A laser beam adjustment apparatus as defined in claim 1, wherein said housing includes an inner tubular member containing and holding said laser and an outer tubular member positioned about said inner tubular member and coaxial therewith, said inner tubular member being independently rotatable about its longitudinal axis with respect to said outer tubular member; whereby said laser may be rotated relative to said outer tubular member, said base means and said first, second and third reflecting means.

6. A laser beam adjustment apparatus as defined in claim 1, further comprising pivot means associated with each of said reflecting means, for adjusting the rotation of said reflecting means around three independent rotational axes.

7. A laser beam adjustment apparatus as defined in claim 1, wherein said first holder is rotatable about the longitudinal axis of said housing.

8. A laser beam adjustment apparatus as defined in claim 1, wherein said second holder is rotatable about the longitudinal axis of said housing.

9. A laser beam adjustment apparatus as defined in claim 1, further comprising adjustment means associated with at least one of said reflecting means, said adjustment means including:
  i. micrometer means attached to at least one of said first or second holders and so disposed that rotation of the micrometric screw tends to pivot the associated reflecting means around a rotational axis thereof.

10. A laser beam adjustment apparatus as defined in claim 9, wherein said adjustment means further include:
  a piezoelectric element provided with end plates of magnetic material, said piezoelectric element being disposed on the tip of said micrometric screw, acting as an extension thereof, and wherein each of said reflecting means includes magnetic material disposed in the vicinity of one of said end plates of said piezoelectric element; whereby said micrometric screw, said piezoelectric element and said magnetic material included in said reflecting means cooperate to form a force-transmitting assembly; whereby rotation of said micrometric screw tends to move the associated reflecting means, and whereby the electrical energization of said piezoelectric element also tends to move the associated reflecting means.

11. A laser beam adjustment apparatus as defined in claim 9 further comprising adjustment means to control the relative rotation of said housing and said base means, said adjustment means including:
  i. micrometric means, coupled to said housing and to said base means; and
  ii. precision scales affixed to said base means and to said housing; whereby a precise adjustment of the relative rotation of said housing and said base means may be made.

* * * * *